July 17, 1951
B. T. CARNIOL
2,561,180
ELECTROSTATICALLY CONTROLLED DIODE VOLTMETER
Filed Feb. 14, 1948
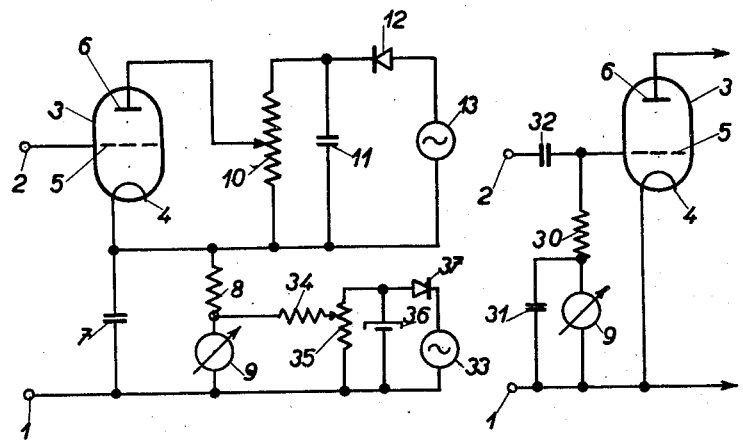
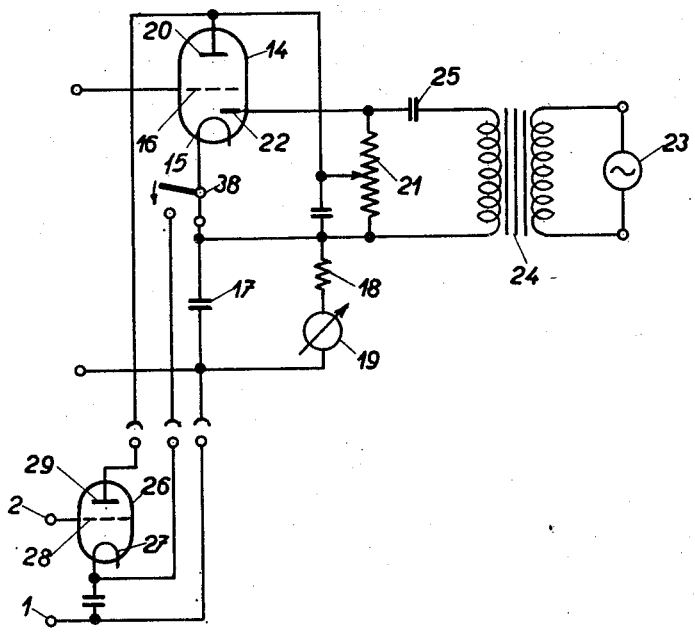
Inventor:
Bohdan Theodor Carniol,
by Patented July 17, 1951

2,561,180

UNITED STATES PATENT OFFICE 2,561,180

ELECTROSTATICALLY CONTROLLED DIODE VOLTMETER

Bohdan Theodor Carniol, Prague, Czechoslovakia, assignor to Tesla, Electrical and Radio Industry, Prague, Czechoslovakia Application February 14, 1948, Serial No. 8,415
In Czechoslovakia August 16, 1946

Section 1, Public Law 690, August 8, 1946
Patent expires August 16, 1966

8 Claims. (Cl. 171—95)

This invention relates to electronic valve, or vacuum tube, voltmeters. Such voltmeters, whether using one or several valves, may have, on the input side, a diode or a valve with several electrodes. The present invention concerns a valve voltmeter the input side of which has a valve with several electrodes.

There are two ways of connecting the diode of a diode voltmeter either by using a parallel connection where the diode is shunted by a branch containing a series connection of a resistance and condenser, the latter being in parallel with the meter, or by using a series connection where the diode is in series with a parallel circuit of a condenser and a resistance in series with the meter. The advantages of diode voltmeters are their simplicity, stability and suitability for use at highest frequencies. Their disadvantages are, however, a low sensitivity at the lower frequencies and their small input resistance. An increase of sensitivity of diode voltmeters to such a value that it becomes possible to get full deflection on the meter for several volts is usually achieved by shifting the working point of the diode characteristic, indicating the dependence of anode current on anode voltage, into the area of greatest curvature, and by compensation of the anode current, by using a very sensitive meter and by decreasing the resistance in series with this meter to the lowest value. Shifting of the working point into the area of greatest curvature which, usually, lies in the area of small negative anode bias, also increases the internal resistance of the voltmeter. This bias is supplied to the cathode branch by means of a resistance in series with the meter. A small rectifier with a filter for smoothing out the voltage is used as a source of D.-C. voltage. Because the demand for high sensitivity requires a small series resistance in the cathode branch, the D.-C. consumption becomes so high that an electrolytic condenser has to be used for smoothing, making the arrangement to a certain degree unstable with time. Replacement of the electrolytic condenser by a condenser with a different dielectric e. g. paper, causes difficulties due to imperfect filtration. Mere compensation of the anode current without first adjusting the working point by a bias on the electrodes does not guarantee a stable calibration chart of the voltmeter on the lower ranges where the diode functions as a nonlinear detector, because changes of the feed voltage cause a shift of the anode characteristic and, hence, also a change of the position of the working point into a place of different curvature. The purpose of the present invention is to supply such a construction of a valve meter which is free of the mentioned defects, and possesses, besides a relatively high order of resistance, sufficient sensitivity and stability.

The valve voltmeter of the invention consists of a triode or multi-grid valve of which the circuit of one electrode—the cathode—is used for measuring voltages in the diode meter connection. Shifting of the working point of the characteristic indicating the dependence of the current of the chosen electrode on its voltage is, according to the invention, achieved by a voltage change on some other electrode. It is advantageous to use the control grid as the measuring electrode and the anode for shifting the working point. In this case it is necessary to make the anode bias larger than the necessary grid bias is. This auxiliary voltage for the anode (which may be connected to the other grids in multi-grid valves) is easily obtained with combined valves containing separate diodes if these diodes are used in the auxiliary rectifier. The advantage of the described arrangement, according to the invention, is in the first place increased sensitivity by adjusting the correct working point by means of biasing the auxiliary electrode, which makes it possible to use very small resistances in series with the meter. No electrolytic condensers causing instability of the arrangement are used for adjusting the working point because the auxiliary electrode (anode) functions here as a static electrode passing no current (having a negative potential). Therefore smoothing of the rectified voltage is made possible in the auxiliary rectifier working on no load by means of a condenser of small capacity having a paper or similar dielectric.

For an understanding of the invention principles, reference is made to the following description of typical embodiments thereof as illustrated in the accompanying drawing.

In the drawing:

Figs. 1 and 2 are schematic circuit diagrams illustrating the basic circuit of the invention.

Fig. 4 is a schematic wiring diagram illustrating a combined valve used in the invention circuit.

In the circuit of Fig. 1, a triode 3 is used as the valve of the voltmeter. The voltage to be measured is applied to terminals 1 and 2, the latter being connected to grid 5. Cathode 4 is connected to terminal 1 through a condenser 7. A resistance 8 and meter 9 are connected in series with each other across condenser 7. Cathode 4 and grid 5 act as a parallel connected rectifier. Suitable adjustment of the working point and of the sensitivity of the voltmeter is, according to the invention, carried out by means of a bias on anode 6. The bias is tapped off the potentiometer 10 to which condenser 11 is connected in parallel, the latter being connected in the circuit of rectifier 12 and the source of the A.-C. voltage 13. Since the auxiliary electrode, that is, in the described arrangement, anode 6, passes no current, condenser 11 charges up to a peak value. The ripple is small even when using a paper condenser of the usual size because it is possible to reduce the current through potentiometer 10 considerably if its resistance is made sufficiently large.

Besides, it is still possible to compensate for the remaining surge current in the usual way by a current in the opposite direction taken through resistance 34 from potentiometer 35, which is fed from the A.-C. source through rectifier 37. Condenser 36 is connected in parallel with potentiometer 35.

Fig. 2 illustrates an alternative circuit connection for the triode 3. Grid 5 is connected to terminal 2 through a condenser 32. A resistance 30 is connected across the terminals in series with meter 9 and a condenser 31 in parallel with the latter. Cathode 4 is connected to terminal 1. The bias on anode 6 is derived in the same manner as in Fig. 1, the same surge compensation arrangement being used.

Fig. 3 shows the wiring of a volmeter according to the invention using a combined diode-triode 14. The cathode 15 and grid 16 of valve 14 are connected in the voltmeter cicuit in the same manner as the cathode 4 and grid 5 of valve 3 in Fig. 1. The bias for the auxiliary valve electrode (in this case the anode 20) is derived from the potentiometer 21. The latter is supplied with rectified voltage from the diode section electrodes 22 and 15 of valve 14, the A. C. voltage being applied to the diode from source 25 through transformer 34. It will be noted that the diode section 15, 22 is connected across transformer 24.

For the measurement of voltages at very high frequencies, valves having a large input capacity cannot be used effectively. To provide for such measurement, the arrangement of Fig. 3 includes an additional valve 26, preferably an "acorn" valve, which may be selectively connected in circuit with meter 19 through the use of a selector switch 33. The cathode 27 and grid 28 of valve 26 are connected to voltage terminals 1 and 2 in the same manner as the cathode and grid of the valve 3 of Fig. 1. The biasing voltage for the auxiliary electrode, anode 29, is derived from potentiometer 21 supplied by rectifier section 15, 22 of valve 14. Either valve 14 or valve 26 is connected to meter 19 dependent upon the position of switch 33.

While specific embodiments of the invention have been shown and described in detail to illustrate the application thereto, it should be understood that the invention may be otherwise embodied without departing from such principles.

What I claim is:

1. In an electronic metering arrangement, an electronic valve having a plurality of electrodes, a pair of which electrodes form a diode current path therebetween within the valve and another of said electrodes lying beyond such path; input terminals respectively connected to the electrodes of said pair and arranged to have applied thereto a potential corresponding to the quantity to be measured, the input terminals and said pair of terminals forming a measuring circuit; a metering device connected in circuit relation with said measuring circuit; a source of potential; and means for applying, from said source to said other electrode, an adjustable constant potential negative relative to at least one of said pair of electrodes.

2. In a vacuum-tube voltmeter circuit according to claim 1 the improvement comprising a thermionic tube having an anode, a cathode, and at least one additional electrode, the cathode being connected in series with a condenser to which a resistance and a meter are connected in parallel, the said thermionic tube being of the combined type, one part of which being connected as a tube voltmeter and the other part as a rectifier to obtain the anode bias.

3. In a vacuum-tube voltmeter circuit according to claim 1 the improvement comprising a thermionic tube having an anode, a cathode, and at least one additional electrode, the cathode being connected in series with a condenser to which a series combination of a resistance and a meter are connected in parallel, the said thermionic tube being a combined diode-triode, its triode part between cathode and grid being connected as a tube voltmeter and its diode part as a rectifier to obtain the anode bias.

4. In a vacuum-tube voltmeter circuit according to claim 1 for long and short waves, the improvement comprising a thermionic tube having an anode, a cathode, and at least one additional electrode, the cathode being connected in series with a condenser to which a series combination of a resistance and a meter are connected in parallel, the said thermionic tube being a combined diode-triode, its triode part between cathode and grid being connected as a tube voltmeter and its diode part as a rectifier to obtain the anode bias, and an additional triode of small input capacity connected by a switch to said voltmeter circuit, the auxiliary bias of the anode of said additional triode being made available to the diode part of said combined tube.

5. In a vacuum-tube voltmeter circuit the improvement comprising a thermionic tube having an anode, a cathode, and at least one additional electrode, the cathode and another electrode being connected to act as a diode voltmeter, and one of the remaining electrodes having a direct current negative potential against the cathode to adjust the working point of said diode connection, a series combination of a resistance and a condenser connected in parallel to the said diode part of the tube, and a meter shunting said condenser.

6. In an electronic metering arrangement, an electronic valve having a plurality of electrodes, a pair of which electrodes form a diode current path therebetween within the valve and another of said electrodes lying beyond such path; input terminals respectively connected to the electrodes of said pair and arranged to have applied thereto a potential corresponding to the quantity to be measured, the input terminals and said pair of terminals forming a measuring circuit; a metering device connected in circuit relation with said measuring circuit; a source of potential; means for applying, from said source to said other electrode, an adjustable constant potential negative relative to at least one of said pair of electrodes; and a resistance-capacitance filter in circuit with said metering device.

7. An electronic metering arrangement as claimed in claim 1 in which said valve is a triode, said pair of electrodes comprise the cathode and grid, and said other electrode comprises the anode.

8. An electronic metering arrangement as claimed in claim 1 in which said source of potential is rectified D. C. and includes ripple filtering means; and a source of compensating potential in circuit connection with said metering device.

BOHDAN THEODOR CARNIOL.

REFERENCES CITED

The following references are of record in the file of this patent:

UNITED STATES PATENTS

| Number | Name | Date |
| --- | --- | --- |
| 1,810,063 | Thomas | June 16, 1931 |
| 1,938,136 | Crew | Dec. 5, 1933 |
| 2,276,152 | Bull | Mar. 10, 1942 |
| 2,356,187 | Swedlow | Aug. 22, 1944 |